under 35
U.S.C. 154(b) by 5 days.

(12) United States Patent
Scozzola

(10) Patent No.: US 10,216,670 B2
(45) Date of Patent: Feb. 26, 2019

(54) SYNCHRONIZATION OF A NETWORK OF SENSORS

(71) Applicant: STMicroelectronics (Grenoble 2) SAS, Grenoble (FR)

(72) Inventor: Giovanni Scozzola, Saint Egreve (FR)

(73) Assignee: STMICROELECTRONICS (GRENOBLE 2) SAS, Grenoble (FR)

( * ) Notice: Subject to any disclaimer, the term of this patent is extended or adjusted under 35 U.S.C. 154(b) by 5 days.

(21) Appl. No.: 15/495,636

(22) Filed: Apr. 24, 2017

(65) Prior Publication Data

US 2018/0181512 A1 Jun. 28, 2018

(30) Foreign Application Priority Data

Dec. 26, 2016 (FR) ...................................... 16 63389

(51) Int. Cl.
| G06F 13/00 | (2006.01) |
| G06F 13/364 | (2006.01) |
| G06F 13/42 | (2006.01) |
| G06F 13/40 | (2006.01) |
| H04Q 9/00 | (2006.01) |

(52) U.S. Cl.
CPC .......... *G06F 13/364* (2013.01); *G06F 13/404* (2013.01); *G06F 13/4282* (2013.01); *H04Q 9/00* (2013.01); *H04Q 2209/753* (2013.01); *H04Q 2209/845* (2013.01)

(58) Field of Classification Search
CPC ... G06F 13/364; G06F 13/4282; G06F 13/404
See application file for complete search history.

(56) References Cited

U.S. PATENT DOCUMENTS

| 6,546,446 | B2 | 4/2003 | Farmwald et al. |
| 8,630,314 | B2 | 1/2014 | York |
| 9,648,701 | B1* | 5/2017 | Maricic ............. H05B 37/0218 |
| 9,986,035 | B2* | 5/2018 | Takeda ................. H04L 12/462 |
| 2010/0141636 | A1* | 6/2010 | Marsanne ............... G09G 3/36 345/213 |
| 2016/0259032 | A1* | 9/2016 | Hehn .................... G01S 5/0289 |
| 2016/0330793 | A1* | 11/2016 | Zhuge ....................... G06F 1/12 |

(Continued)

FOREIGN PATENT DOCUMENTS

JP 02010-166150 A * 7/2010

OTHER PUBLICATIONS

Freescale Semiconductor, Inc., "Xtrinsic FXLC95000CL Intelligent, Motion-Sensing Platform", Data Sheet: Technical Data, Rev. 1.2, Aug. 2013, 38 pages.

(Continued)

*Primary Examiner* — Jing-Yih Shyu
(74) *Attorney, Agent, or Firm* — Slater Matsil, LLP

(57) ABSTRACT

The invention relates to a system comprising a plurality of boards, each of which comprises a sensor and a control processor. The boards are connected together by a serial bus. One of the boards acts as master and the others as slaves. The master board is suitable for accessing the measurements of the plurality of boards and for sending these measurements, via a UART connection, to a host processor. The acquisition of the measurements takes place according to a specific synchronization method.

18 Claims, 3 Drawing Sheets

(56) References Cited

U.S. PATENT DOCUMENTS

2017/0041688 A1* 2/2017 Pitigoi-Aron ............ H04Q 9/00
2017/0082731 A1* 3/2017 Herbel ................... G01S 7/003

OTHER PUBLICATIONS

TE Connectivity, "MS5637 Peripheral Module Digital Pressure Sensor", Product Sheet, Mar. 2015, 4 pages.
Invensense, Inc., "ICM-30630 Product Specification", Revision 1.0, Nov. 19, 2014, 42 pages.
STMicroelectronics, "iNEMO inertial module: always-on 3D accelerometer and 3D gyroscope", LSM6DSL, DocID 028475, Rev. 5, Oct. 2016, 113 pages.
Texas Instruments Inc., "Enabling Low-Power Windows 8 HID Over I2C Applications Using MSP430 Microcontrollers", Application Report, SLAA569—Nov. 2012, 13 pages.

* cited by examiner

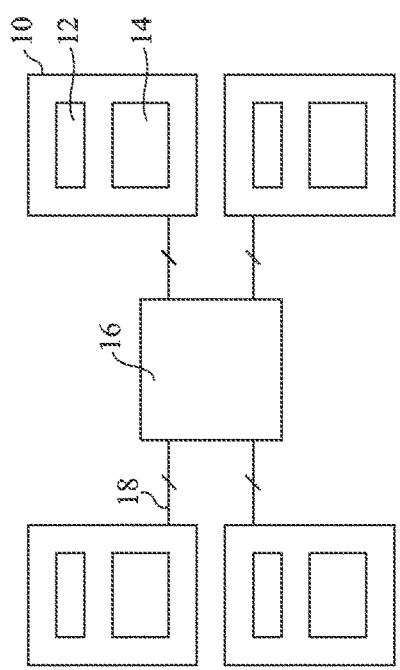
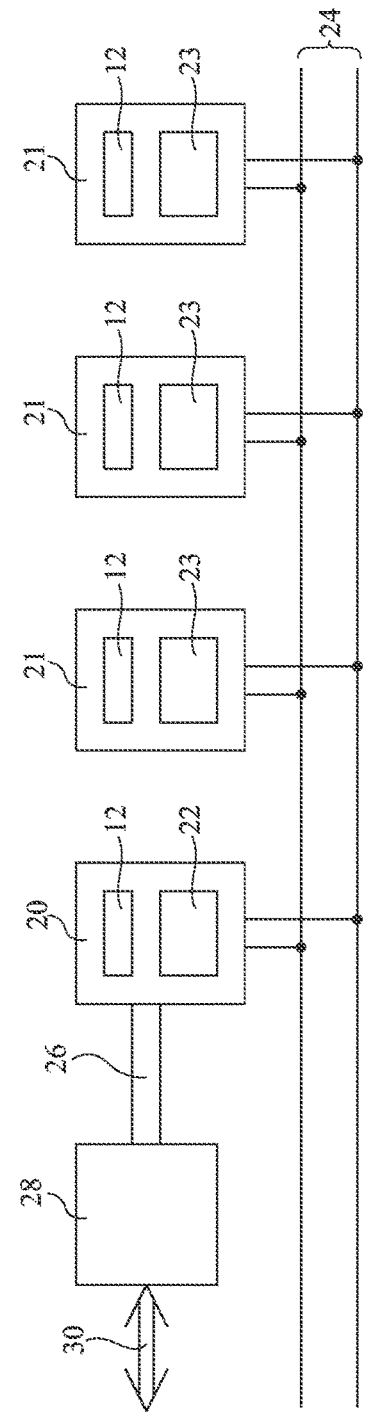

SYNCHRONIZATION OF A NETWORK OF SENSORS

CROSS-REFERENCE TO RELATED APPLICATIONS

This application claims priority to French Patent Application No. 1663389, filed on Dec. 26, 2016, which application is hereby incorporated herein by reference.

TECHNICAL FIELD

The present application relates to synchronization of a network of sensors.

BACKGROUND

In numerous practical cases, it is desired to use a network of sensors with digital outputs to acquire various parameters of one or more targets to be analyzed. These sensors can, for example, be pressure sensors, temperature sensors, luminous intensity sensors and/or distance sensors.

A time-of-flight, or TOF, sensor is an example of a distance sensor. This sensor comprises a light source emitting light towards a target point, the distance of which from the sensor must be determined. The sensor receives the light returned by the target point. The time-of-flight measurement, i.e., the time taken by the light to cover the distance from the light source to the target point, and, on the return path, from that point to the sensor, enables the distance separating the sensor from the target point to be calculated.

FIG. 1 represents a set of four boards 10, each board 10 comprising a sensor 12 and a control processor 14. The four boards 10 are connected by a parallel link to the same processor 16 suitable for controlling the boards 10 and for programming the processors 14 via connections 18 operating, for example, according to a Universal Asynchronous Receiver-Transmitter (UART) protocol.

The processor 16 sends, over the connections 18, commands or programming codes to the boards 10 and receives measurement data from the various sensors 12.

In practice, the connections corresponding to the connections 18 do not allow all the sensors to be driven by the processor of one of the sensors.

SUMMARY

Embodiments of the present application relate to the connection of a network of sensors and particular embodiments relate the synchronization of the acquisition of their measurements.

It can be useful to obtain measurements taken at the same instant by several sensors. For example, it may be desirable to determine the instantaneous position of a moving target by means of a set of time-of-flight sensors.

One embodiment provides a measurement acquisition synchronization method for a system comprising a plurality of boards, each of which comprises a sensor and a control processor. One among the plurality of boards acts as master and the others as slaves. The master board is suitable for accessing the plurality of boards. For each board, a count is provided, the count representing the time separating the instant of reception of a measurement acquisition start command transmitted by the master board and the measurement acquisition end instant. The method includes calculating at the master board, as a function of the counts, delays to be applied to the acquisition start commands of the boards in order that the acquisitions of all the boards end at the same instant. The acquisition start commands are transmitted to the plurality of boards, the start of acquisition for each board being delayed by the value of the delay calculated for that board.

According to one embodiment, the exchanges between the master board and the slave boards are performed via an I2C bus.

According to one embodiment, the delay $R_i$ to be applied to the acquisition start command of a board i is calculated according to the following formula:

$$R_i = (N-i)*C + C_N - C_i$$

where the index i denotes a board and the index N denotes the board for which the acquisition ends last, where i=0 ... N, C is a count, fixed by the master board, between the transmissions, by the master board, of commands to two successive boards, and $C_i$ is a count performed for a board i between the instant of reception of a measurement acquisition start command and the measurement acquisition end instant.

One embodiment provides a system comprising a plurality of boards, each of which comprises a sensor and a control processor, connected together by a serial bus, one among the plurality of boards acting as master and the others as slaves, the master board being suitable for accessing the measurements of the plurality of boards and for sending these measurements via a UART connection to a host processor, the acquisition of the measurements taking place according to the method above.

According to one embodiment, the serial bus is an I2C bus.

According to one embodiment, the sensors are time-of-flight sensors.

According to one embodiment, the processor of the master board and the host processor are co-integrated, the UART link remaining accessible.

BRIEF DESCRIPTION OF THE DRAWINGS

These features and advantages, as well as others, will be described in detail in the following description of particular embodiments, which description is given in a non-limiting manner with reference to the accompanying figures in which:

FIG. 1, described previously, represents, schematically and partially, sensors connected to a common processor via a parallel link;

FIG. 2 represents, schematically and partially, an embodiment of a system of sensors.

DETAILED DESCRIPTION OF ILLUSTRATIVE EMBODIMENTS

Figure 3:
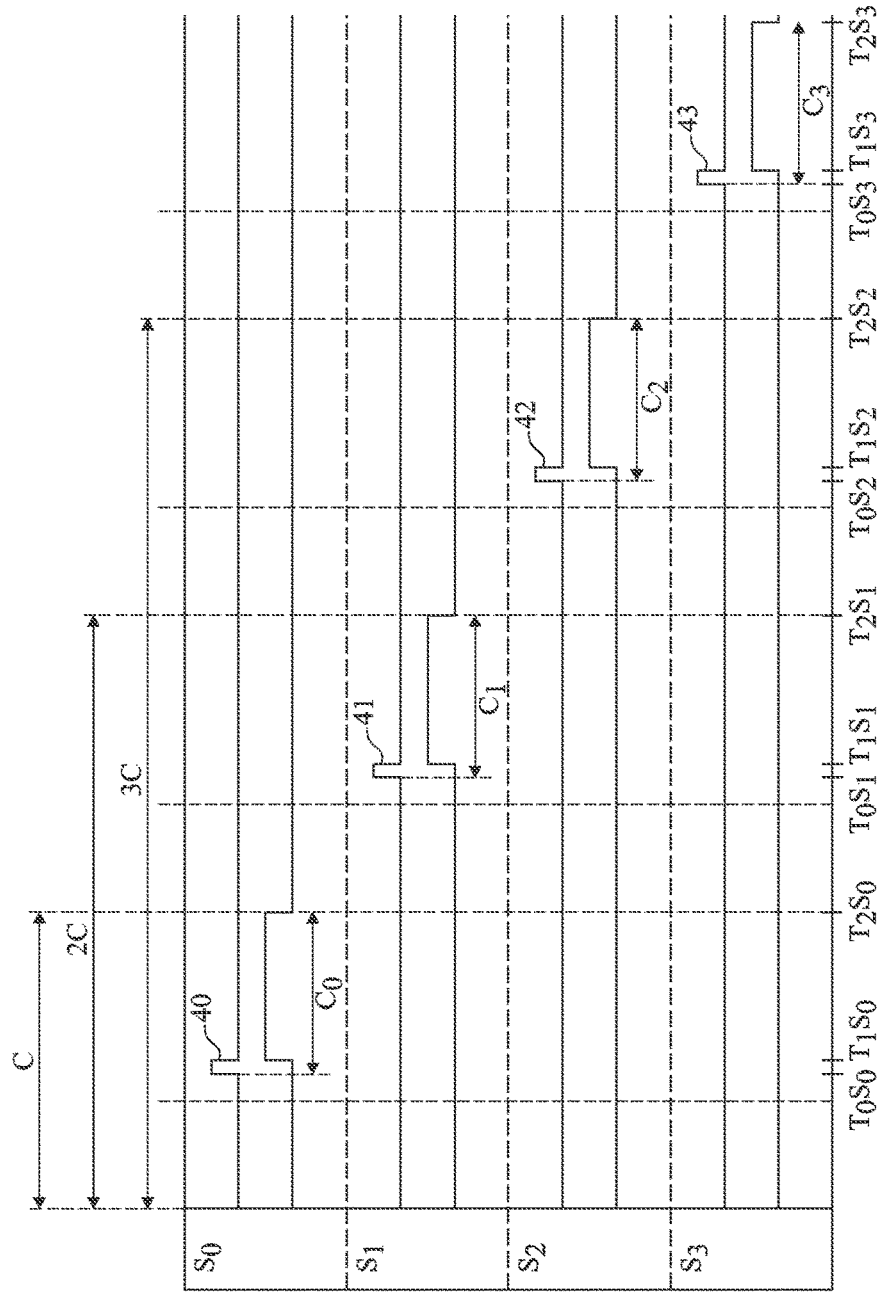
FIGS. 3 and 4 are timing diagrams representing the operation of one embodiment of a sensor measurement acquisition synchronization method.

The same items have been denoted by the same references in the various figures and, moreover, the timing diagrams are not drawn to scale. For the sake of clarity, only items helpful for understanding the embodiments described have been represented and are detailed.

FIG. 2 represents four boards, among which one board 20 is configured to act as master and three boards 21 are configured to act as slaves. Four boards are described here by way of example. In practice, there is generally a larger number of boards, for example, sixteen, one of which is a master board. When appropriate, it will be considered that there are N+1 boards, of index i between 0 and N.

The master board 20 and the slave boards 21 all comprise a sensor 12. The master board 20 comprises a processor 22, and each of the slave boards 21 comprises a processor 23.

The programming of the processors 23 of the slave boards is limited, in this configuration, to providing operational tasks of the sensor 12 of this board, i.e., starting and stopping measurement acquisition, preserving measurements in registers, etc. The programming of the processor 22 of the master board 20 allows it to accomplish tasks in addition to those accomplished by the processors 23 of the slave boards 21, for example, accessing the registers of the processors 23, or transmitting data to external circuits, or driving the slave processors, for example, for calibration operations, data formatting, regulating power supplies, level shifting, interference suppression, etc.

The board 20 and the boards 21 are coupled to a serial bus 24, preferably an I2C bus. An advantage of an I2C protocol for exchanges between the boards 20 and 21 is its ease of use. It involves a simple protocol, that can be handled by the majority of recent programmable components, and which allows a master/slave configuration. Furthermore, the I2C link requires only two wires, thereby making it simple to implement.

The master board 20 is connected, for example, by a UART connection 26, to a host processor 28. In one embodiment, the host processor 28 is integrated in the processor 22 of the master board, a UART link being accessible with the outside.

An advantage of the UART connection is that it is well known and commonly used by practitioners in programming. Indeed numerous existing and easily accessible circuits, for example, converters or data processing circuits, operate according to a UART protocol.

The host processor 28 is a processor suitable for receiving data from the master board 20 via a UART connection and for processing and/or transmitting the data, for example, over a wireless connection 30. The processor 28 is also suitable for receiving instructions from an external device, for example, a mobile phone, and for controlling the master processor 22 or changing its programming. The external device can contain logic or graphics processors.

When the master board 20 starts an acquisition, acquisition start commands specific to each board are sent to the addresses of the corresponding boards via the I2C bus 24. The boards receive their specific acquisition start command one after the other according to a programmed order, for example, by the programming of their addresses. The measurements of the sensors 12 are preserved in registers of the processors 23 of the slave boards 21. The master board 20 accesses the registers of the processor 22 of the master board 20 or the registers of the processors 23 of the slave boards 21 via the I2C bus and makes the measurements obtained available on the UART connection 26.

To accurately detect the conditions of one or more target objects, it is desirable that all the sensors in a system of sensors acquire the data relating to this or these target objects at the same instant. These sensors can be of the same kind or be different from one another. There is provided here a synchronization method for providing this simultaneous acquisition function. For reasons of simplification, this method will be described hereafter, purely by way of example, with reference to time-of-flight sensors, but it will be understood that it applies to the synchronization of all types of sensors.

To accurately detect the instantaneous position of an object to be analyzed, all the time-of-flight sensors should perform a measurement at the same instant. Therefore, there is a synchronization problem for these sensors.

Figure 4:
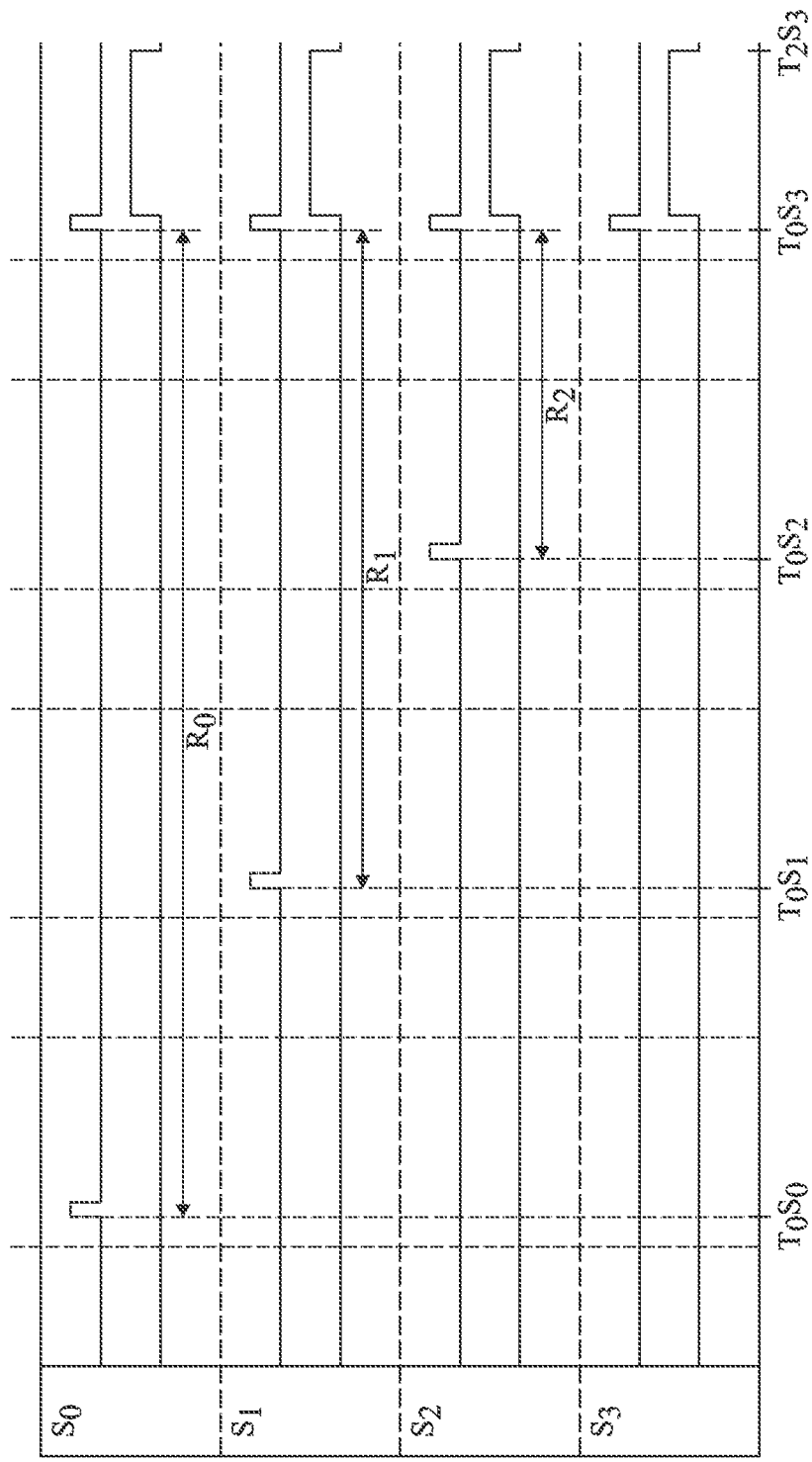

FIG. 3 represents a step for initializing a synchronization process and FIG. 4 illustrates how a synchronization process is carried out.

It is assumed that the master board sends various control instructions to itself and to all the other boards, at periods spaced by a duration corresponding to a count C performed by the processor of the master board. The instructions notably comprise instructions for addressing a board, instructions for reading the sensor of the preceding board, instructions for reading a counter of the preceding board, and acquisition start instructions.

FIG. 3 represents, in the particular case of four boards, $S_0$, $S_1$, $S_2$, $S_3$, timing diagrams corresponding to each of these boards. Thus, each of the boards $S_0$, $S_1$, $S_2$, $S_3$, upon receiving an acquisition start instruction provided at its address, produces an acquisition start pulse 40, 41, 42, 43. Then, over durations corresponding to respective counts $C_0$, $C_1$, $C_2$, $C_3$, each of the boards performs a time-of-flight acquisition by means of its sensor. For each board, there is indicated an instant $T_0S_0$, $T_0S_1$, $T_0S_2$, $T_0S_3$ at which this board receives the control instructions. The boards begin their acquisitions at respective instants $T_1S_0$, $T_1S_1$, $T_1S_2$, $T_1S_3$ and finish their acquisitions at respective instants $T_2S_0$, $T_2S_1$, $T_2S_2$, $T_2S_3$.

The counts $C_0$, $C_1$, $C_2$, $C_3$ are performed at each board over the acquisition duration of the board in question and therefore take into account possible drifts, for example, clock failures and instruction fetch shifts.

When proceeding in the manner indicated in FIG. 3, the time-of-flight acquisitions are performed by each of the boards at successive instants shifted by the duration C between two commands transmitted by the master board. Thus, in the case of the detection of a moving object, the object will have moved between four measurements which are not performed at the same instant.

The counts $C_0$, $C_1$, $C_2$, $C_3$ defined with reference to FIG. 3 during an initialization phase of a synchronization method are used here. Then, as illustrated in FIG. 4, the process proceeds with shifting the acquisition start instants of the various boards, taking into account initialization measurements made during the steps described with reference to FIG. 3.

If the description of the system is generalized, and if it is considered that the system comprises not four but N+1 boards i, where i is between 0 and N, the actual start of the data acquisition by a board is delayed by a delay:

$$R_i = (N-i)*C + C_N - C_i$$

where the index i denotes a board, the index N denotes the board for which the acquisition ends last, where i=0 ... N, C is a count, fixed by the master board, between the transmissions, by the master board, of commands to two successive boards, and $C_i$ is a count performed for a board i between the instant of reception of a measurement acquisition start command and the measurement acquisition end instant.

The delays $R_0$, $R_1$ and $R_2$ can be seen in FIG. 4 in the particular case of an embodiment with only four boards. The start of the data acquisition of the board $S_0$ is delayed by a delay $R_0$, and that of the board $S_1$ by a delay $R_1$, and that of the board $S_2$ by a delay $R_2$. Thus, the acquisitions of all the boards will all end at the same instant $T_2S_3$ of the end of acquisition by the board $S_3$.

In practice, notably in the case of the detection of a moving object, it is desirable to perform several successive acquisitions of the position of this object. The process described with reference to FIG. 4 can be carried out several times in succession, assuming that the counts $C_0$, $C_1$, $C_2$, $C_3$ are unlikely to vary over time. On the other hand, if it is assumed that these counts are capable of varying, for example, because the various sensors are subjected to highly variable experimental conditions (temperature, acceleration, variations in atmospheric conditions, etc.), then, before each acquisition of the type described with reference to FIG. 4, an initialization step of the type described with reference to FIG. 3 will be carried out.

It will be noted that, by virtue of the use of a serial bus such as an $I^2C$ bus between the various boards, the synchronizations of transmissions of successive orders to the addresses of the various boards are particularly simple to implement.

What is claimed is:

1. A measurement acquisition synchronization method for use with a system that comprises a master board and a plurality of slave boards, the master board and each slave board comprising a sensor and a control processor and the master board being suitable for accessing the slave boards, the method comprising:

performing, for each slave board, a count representing a time separating an instant of reception of a measurement acquisition start command transmitted by the master board and a measurement acquisition end instant;

calculating, at the master board and as a function of the counts, delays to be applied to acquisition start commands of the slave boards so that acquisitions of the plurality of slave boards end at a same instant of time; and transmitting the acquisition start commands to the plurality of slave boards, the start of acquisition for each slave board being delayed by a value of the delay calculated for that slave board, wherein a delay $R_i$ to be applied to the acquisition start command of a slave board i is calculated according to the following formula:

$$R_i = (N-i)*C + C_N - C_i$$

where
index i denotes a board and index N denotes the board for which acquisition ends last, where i=0 . . . N,
C is a count, fixed by the master board, between the transmissions, by the master board, of commands to two successive slave boards, and
$C_i$ is a count performed for a board i between the instant of reception of a measurement acquisition start command and the measurement acquisition end instant.

2. The method according to claim 1, wherein exchanges between the master board and the slave boards are performed via an I2C bus.

3. A system comprising:
a plurality of slave boards, each slave board comprising a sensor and a control processor;
a master board comprising a sensor and a control processor, the master board being configured to access measurements of the plurality of slave boards; and
a serial bus connecting the master board and the slave boards;
wherein the control processor of the master board is programmed to calibrate acquisitions of information from each of the slave board, the control processor of the master board being configured to:
receive a count from each slave board, each count representing a time separating an instant of reception of a measurement acquisition start command transmitted by the master board to that slave board and a measurement acquisition end instant for that slave board;
for each slave board, calculate a delay to be applied to an acquisition start command of that slave board, the delay being calculated as a function of the count received from that slave board; and
transmit each acquisition start command to the respective slave board so that the respective slave board delays a start of acquisition by a value of the delay calculated for that board so that acquisitions of all slave boards end at a same instant of time, wherein a delay $R_i$ to be applied to the acquisition start command of a slave board i is calculated according to the following formula:

$$R_i = (N-i)*C + C_N - C_i$$

where
index i denotes a board and index N denotes the board for which acquisition ends last, where i=0 . . . N,
C is a count, fixed by the master board, between the transmissions, by the master board, of commands to two successive slave boards, and
$C_i$ is a count performed for a board i between the instant of reception of a measurement acquisition start command and the measurement acquisition end instant.

4. The system according to claim 3, wherein the serial bus is an I2C bus.

5. The system according to claim 3, wherein the sensors of the slave boards and the master board are time-of-flight sensors.

6. The system according to claim 3, further comprising a host processor coupled to the master board.

7. The system according to claim 6, wherein the control processor of the master board and the host processor are co-integrated in a single processor.

8. The system according to claim 6, wherein the master board is configured to send measurements to the host processor via a Universal Asynchronous Receiver-Transmitter (UART) connection.

9. The system according to claim 8, wherein the control processor of the master board and the host processor are co-integrated in a single processor.

10. The system according to claim 3, wherein the control processor of each slave board is programmed to control operational tasks of the sensor of that slave board.

11. The system according to claim 10, wherein the control processor of the master board is programmed to control operational tasks of the sensor of the master board, the control processor of the master board also being programmed to perform additional tasks, wherein the control processor of each slave board is not programmed to perform the additional tasks.

12. A method for use with a system that comprises a master board and a plurality of slave boards, the master board and each slave board comprising a sensor and a control processor, the method comprising:
for each slave board, determining a count representing a time separating an instant of reception of a measurement acquisition start command and a measurement acquisition end instant;

calculating, at the master board, a respective delay value for each slave board, the respective delay value being a function of the count determined for that slave board;

transmitting an acquisition start command to each slave boards;

starting an acquisition at each slave board, the acquisition being started at an instant based on an instant of receipt of the acquisition start command and the respective delay value for that slave board so that the acquisitions of the plurality of slave boards end at a same instant of time; and transmitting a result of the acquisition from each slave board to the master board, wherein the respective delay value $R_i$ calculated for each slave board i is calculated according to the following formula:

$$R_i=(N-i)*C+C_N-C_i$$

where index i denotes a board and index N denotes the board for which the acquisition ends last, where i=0 . . . N, C is a count, fixed by the master board, between the transmissions, by the master board, of commands to two successive slave boards, and $C_i$ is a count performed for a board i between the instant of reception of a measurement acquisition start command and the measurement acquisition end instant.

13. The method according to claim 12, wherein exchanges between the master board and the slave boards are performed via an I2C bus.

14. The method according to claim 12, wherein the acquisitions are performed using the sensors of the slave boards, the sensors comprising time-of-flight sensors.

15. The method according to claim 12, further comprising sending information based on the results of the acquisitions to a host processor.

16. The method according to claim 15, wherein the information is sent from the control processor of the master board to the host processor, wherein the control processor of the master board and the host processor are co-integrated in a single processor.

17. The method according to claim 15, wherein the information is sent from the control processor of the master board to the host processor via a Universal Asynchronous Receiver-Transmitter (UART) connection.

18. The method according to claim 12, further comprising starting an acquisition at the master board, the acquisition at the master board being started at an instant so the acquisitions at all of the slave boards and the acquisition at the master board end at a same instant of time.

* * * * *